(12) United States Patent
Mendyk

(10) Patent No.: US 9,963,255 B2
(45) Date of Patent: May 8, 2018

(54) STERILE INDIVIDUAL SET FOR PRODUCING BIOPHARMACEUTICAL PRODUCTS

(71) Applicant: SARTORIUS STEDIM BIOTECH S.A., Aubagne (FR)

(72) Inventor: Nicolas Mendyk, Peypin (FR)

(73) Assignee: SARTORIUS STEDIM FMT SAS, Aubagne (FR)

( * ) Notice: Subject to any disclaimer, the term of this patent is extended or adjusted under 35 U.S.C. 154(b) by 557 days.

(21) Appl. No.: 14/390,838

(22) PCT Filed: Apr. 19, 2013

(86) PCT No.: PCT/FR2013/050872
§ 371 (c)(1),
(2) Date: Oct. 6, 2014

(87) PCT Pub. No.: WO2013/160594
PCT Pub. Date: Oct. 31, 2013

(65) Prior Publication Data
US 2015/0056693 A1 Feb. 26, 2015

(30) Foreign Application Priority Data
Apr. 24, 2012 (FR) ..................................... 1253774

(51) Int. Cl.
*B65B 5/06* (2006.01)
*B65B 13/02* (2006.01)
(Continued)

(52) U.S. Cl.
CPC ............. *B65B 5/067* (2013.01); *B65B 5/045* (2013.01); *B65B 9/00* (2013.01); *B65B 13/02* (2013.01);
(Continued)

(58) Field of Classification Search
CPC ................................. B65H 75/36; H01B 7/40
See application file for complete search history.

(56) References Cited

U.S. PATENT DOCUMENTS

| 5,284,003 A | 2/1994 | Goodman et al. |
| 5,853,207 A | 12/1998 | Saint Martin et al. |
| 2012/0312415 A1 | 12/2012 | Gay et al. |

FOREIGN PATENT DOCUMENTS

| EP | 0688020 A1 | 12/1995 |
| EP | 1360121 A1 | 11/2003 |

(Continued)

OTHER PUBLICATIONS

XP002689925, http://www.jbg-metafix.com/gaineflash/Fiche%20recto%20verso%20gene.pdf, Jan. 9, 2013.
(Continued)

*Primary Examiner* — William H. Beisner
(74) *Attorney, Agent, or Firm* — Young & Thompson

(57) ABSTRACT

A sterile individual set for use in a process of manufacturing a biopharmaceutical product. To make it quicker and easier to grasp and use fluidic type functional members, the sterile individual set includes a sterile flexible bag having a peripheral wall defining a sterile internal space and a fluidic type functional member arranged at least partially inside the sterile internal space. The functional member includes one or more communication duct(s) arranged in the sterile internal space. The sterile individual set also includes structural association elements capable of holding together several portions of the communication duct or ducts that are to be bundled together into a bundle. The structural association elements have an external surface with lower static and dynamic friction coefficients so as to make the functional member easier to handle by slippage of the bundle of communication ducts with respect to the peripheral wall of the flexible bag.

17 Claims, 5 Drawing Sheets

(51) Int. Cl.
   *B65B 69/00*    (2006.01)
   *B65B 5/04*     (2006.01)
   *B65D 63/10*    (2006.01)
   *H02G 3/04*     (2006.01)
   *B65B 9/00*     (2006.01)
(52) U.S. Cl.
   CPC ............ *B65B 13/022* (2013.01); *B65B 69/00* (2013.01); *B65D 63/10* (2013.01); *H02G 3/0487* (2013.01); *B65D 2231/001* (2013.01)

(56) References Cited

FOREIGN PATENT DOCUMENTS

| | | | | |
|---|---|---|---|---|
| FR | 2956092 A1 | | 8/2011 | |
| GB | 2297577 A | * | 8/1996 | .............. F16L 3/233 |
| GB | 2309257 A | * | 7/1997 | .............. F16G 11/00 |
| WO | 0183315 A1 | | 11/2001 | |
| WO | WO 2011098724 A1 | * | 8/2011 | .............. B65B 3/003 |

OTHER PUBLICATIONS

Viard, J., "Traitement plasma et caracterisations de surface des silicones", XP002689924, http://www.materiatech-carma.net/html/pdf/clubmat23%20coating%20plasma.pdf, Jan. 9, 2013.
French Search Report, dated Jan. 10, 2013, from corresponding FR application.
International Search Report, dated Jul. 25, 2013, from corresponding PCT application.

* cited by examiner

STERILE INDIVIDUAL SET FOR PRODUCING BIOPHARMACEUTICAL PRODUCTS

FIELD OF THE INVENTION

The invention relates to the technical field of the production of biopharmaceutical products.

In a first aspect, the invention concerns a sterile individual set intended for use in the process of manufacturing a biopharmaceutical product.

In a second aspect, the invention concerns a method for packaging a sterile individual set intended for use when manufacturing a biopharmaceutical product.

In a third aspect, the invention concerns a method for unpackaging a sterile individual set intended for use when manufacturing a biopharmaceutical product.

BACKGROUND OF THE INVENTION

It is accepted in the biopharmaceutical field to use sterile individual sets comprising a sterile flexible bag having a peripheral wall defining a sterile internal space within which one or more fluidic-type functional member(s) is arranged, such as containers, tubes, or ports, which are part of more or less complex sets that can comprise a plurality of containers, tubes, and operative means, possibly associated with each other.

By convention, "biopharmaceutical product" is understood here to mean a fluid originating from biotechnology—culture media, cell cultures, buffer solutions, artificial nutrition liquids—or a pharmaceutical fluid or more generally a fluid intended for use in the medical field.

In the technical field of biopharmaceutical production, there are various known prior art solutions to the challenges of orderly and organized retention of fluidic-type functional members within the sterile internal space of a flexible bag, to make it faster and easier to grasp and use these functional members during the manufacture of biopharmaceutical products.

In particular, a sterile individual set according to the preamble of claim 1 is known to the skilled person by the example given in document FR-A1-2,956,092. That document describes a sterile individual set comprising a bag provided with a peripheral wall defining a sterile internal space within which a functional member is arranged, corresponding for example to a distribution means. This distribution means has a plurality of communication conduits also arranged within the sterile internal space of the bag and provided to ensure the sterile fluid transfer of fluid components during the manufacture of a biopharmaceutical product. To ensure proper organization and facilitate the manipulation of these communication conduits within the sterile internal space, the sterile individual set described by FR-A1-2,956,092 comprises structural association means that group a portion of the communication conduits together to form a communication conduit bundle. More particularly, these structural association means are formed by thin straps that are looped to constitute ties which allow defining a communication conduit bundle.

However, such an embodiment has several disadvantages. In particular, due to the composition of the communication conduits and the peripheral wall of the flexible bag, friction forces are generated between the communication conduits and the peripheral wall during the insertion or removal of the bundle of communication conduits into or from the sterile internal space of the flexible bag. These frictional forces have the effect of interfering with operator manipulations of the bundle of communication conduits and therefore lengthen the phases of inserting or removing the functional member into or from the flexible bag. In addition, these frictional forces generate stresses on the peripheral wall of the flexible bag which may damage the bag, thus increasing the risk of a loss of integrity of the sterile internal space of the flexible bag.

One solution for overcoming these adhesion issues consists of a surface treatment to reduce the frictional forces between the outer face of the communication conduits and the peripheral wall. The publication "Traitement plasma et caractérisations de surface des silicones" (Plasma treatment and surface characterizations of silicones) by J. Viard, available on the Internet, concerns creating a fluorine plasma in order to deposit a thin fluorine layer on the outer surface of silicone tubes and thus reducing their adhesion.

However, such a solution changes the composition of the communication tubes. This creates qualification issues in the manufacture of biopharmaceutical products, and requires applying a surface treatment which significantly complicates their manufacture and therefore leads to procurement issues and additional production costs.

In a technical field that is completely different from biopharmaceutical production, such as the handling of electrical cables, prior art structural association means are known that are formed by flexible spiral sheaths. As an illustrative example, an embodiment of such flexible spiral sheaths is commercially available under the brand Pro-Tec-To Wrap® which aims to provide protection for bundled electrical cables that is both flexible and resistant.

However, using such spiral sheaths to form a bundle of fluid communication conduits in the technical field of biopharmaceutical production has never been mentioned, nor has employing such flexible spiral sheaths to reduce—or even eliminate—the adhesion of such a bundle of communication conduits to a peripheral wall of a flexible bag.

SUMMARY OF THE INVENTION

In this context, the aim of the invention is to propose a sterile individual set intended for use in the process of manufacturing a biopharmaceutical product and which is without at least one of the previously mentioned limitations.

More particularly, and according to one of its aspects, the invention aims to provide a sterile individual set intended for use when manufacturing a biopharmaceutical product and which allows organizing and arranging a sterile functional member within the sterile internal space of a flexible bag while facilitating the manipulation of the sterile functional member so as to manipulate it within the sterile internal space.

To this end, a first aspect of the invention relates to a sterile individual set intended for use in the process of manufacturing a biopharmaceutical product, comprising a sterile flexible bag provided with a peripheral wall defining a sterile internal space and a fluidic-type functional member arranged at least partially within the sterile internal space. The functional member comprises one or more communication conduit(s) (also referred to herein as "communication ducts") arranged within the sterile internal space, adapted to ensure the sterile fluid transfer of fluid components and having an external surface with higher static and dynamic friction coefficients. The sterile individual set also comprises structural association means arranged within the sterile internal space and capable of holding together a plurality of portions to be bundled of the communication conduit(s) so as to constitute a communication conduit bundle forming a structural unit that can be manipulated as such. The structural association means which are arranged about and along the bundle of communication conduits have an external surface with lower static and dynamic friction coefficients than the external surface of the one or more communication conduit(s) of the functional member, so as to facilitate manipulation of the functional member by sliding said bundle of communication conduits relative to the peripheral wall of the flexible bag.

With this arrangement, the structural association means combine two functions. Firstly, they ensure the structural integrity of the bundle of communication conduits, and secondly, they facilitate sliding this bundle of communication conduits relative to the peripheral wall. This arrangement therefore has the effect of facilitating the manipulation of said bundle of communication conduits during manipulation of the functional member within the flexible bag. It also decreases the frictional forces generated by the communication conduits on the peripheral wall, which reduces the stresses on the peripheral wall of the flexible bag as well as the chances of an associated loss of fluidtightness. In general, this embodiment simplifies, accelerates, and decreases the chance of damage from, the manipulation—particularly the insertion and removal—of the functional member within the flexible bag.

In one embodiment, the structural association means comprise at least one open or closed component section that is elastically deformable so as to clamp the portions to be bundled of the communication conduit(s). The advantage of such elastically deformable component sections is that this allows forming communication conduit bundles of various sizes, in a simple manner and using the same structural association means. Furthermore, the use of open component sections can simplify and speed up the bundling of the communication conduit(s), while the use of closed component sections limits the risk of the bundled communication conduits coming apart.

More particularly, according to one embodiment, the structural association means have a plurality of component sections arranged discontinuously along the bundle of communication conduits, such that two successive component sections are spaced apart in the longitudinal direction of the bundle of communication conduits by a maximum predetermined distance so as to substantially negate the effects of dynamic friction between the bundle of communication conduits and the peripheral wall of the sterile flexible bag. It is therefore not necessary to position the structural association means continuously along the entire length of the bundle of communication conduits, which reduces the use of structural association means as well as the corresponding production costs, and speeds up the step of forming the bundle of communication conduits.

In one embodiment, the structural association means are formed by one or more flexible spiral sheath(s) having a succession of turns distributed along the bundle of communication conduits. In this manner, the structural association means are both modular and secure since the turns of the flexible spiral sheath can be elastically deformed so as to clamp different sizes of communication conduit bundles without allowing any of the portions of the communication conduit(s) to be bundled to escape.

In this case, according to one embodiment, the structural association means are formed by a single flexible spiral sheath arranged continuously along the bundle of communication conduits. The possibility of the bundle of communication conduits adhering to the peripheral wall of the flexible bag is thus managed continuously along the entire length of said bundle of communication conduits.

Conversely, according to an alternative embodiment, the structural association means are formed by a plurality of flexible spiral sheaths arranged discontinuously along the bundle of communication conduits, such that two successive flexible spiral sheaths are spaced apart in the longitudinal direction by a predetermined maximum distance so as to substantially negate the effects of dynamic friction between the bundle of communication conduits and the peripheral wall of the flexible bag.

In this case, according to one embodiment, the maximum distance separating two successive flexible spiral sheaths is about 20 centimeters, which serves to reduce the length of the flexible spiral sheaths while eliminating most of the effects of dynamic friction.

According to one embodiment, each of the flexible spiral sheaths has, when in place around the bundle of communication conduits, a minimum length of about 10 centimeters in the longitudinal direction, which limits the number of parts to be assembled and thus simplifies the process of forming the bundle of communication conduits.

Furthermore, according to one embodiment, the flexible spiral sheaths have identical structural characteristics, which simplifies their procurement.

In one embodiment, two successive turns of the flexible spiral sheath(s) are spaced apart in the longitudinal direction by a maximum distance of about 4 centimeters. This allows reducing the risk of the peripheral wall coming in contact with the communication conduits between two successive turns of the flexible spiral sheath.

In this case, according to another embodiment, the or the at least one flexible spiral sheath(s) has (have), on the one hand, a middle portion wound around the set of portions to be bundled of the bundle of communication conduits, and on the other hand, at least one end portion wound only around a portion to be bundled of one of the communication conduits forming the bundle of communication conduits. As the end portion of the flexible spiral sheaths may sometimes be sharp, such an arrangement reduces the risk of damage to the communication conduits while ensuring a simple and effective bundling of the bundle of communication conduits.

In one embodiment, the individual set comprises a plurality of separate and independent structural association means, some being adapted to retain a plurality of portions to be bundled of the communication conduit(s) so as to form a first bundle of communication conduits which can be manipulated as such, the others being adapted to retain a plurality of other portions to be bundled of the communication conduit(s) so as to form a second bundle of communication conduits which can be manipulated as such and independently of the first bundle of communication conduits.

According to a second aspect, the invention also relates to a method for packaging or unpackaging an individual set of the invention, consisting of using structural association means having an external surface with lower static and dynamic friction coefficients to form the bundle of communication conduits so as to facilitate the insertion or removal of the functional member into or from the flexible bag by sliding said bundle of communication conduits relative to the peripheral wall of the flexible bag. This greatly facilitates manipulation of the functional member when it is positioned within the flexible bag. In particular, the steps of inserting the functional member into the flexible bag or removing said functional member from the flexible bag are faster and are less likely to damage the flexible wall of the individual set.

In one aspect, the invention therefore relates to a method for packaging an individual set intended for use in the process of manufacturing a biopharmaceutical product, comprising a plurality of steps consisting of: providing a flexible bag suitable for being sterilized and equipped with a peripheral wall defining a sterile internal space; providing a fluidic-type functional member comprising one or more communication conduit(s) which on the one hand are suitable for the sterile fluid transfer of fluid components and on the other hand have an external surface with higher static and dynamic friction coefficients. The packaging method comprises a step of arranging around and distributing, along one or more portion(s) to be bundled of the communication conduit(s), structural association means having an external surface with lower static and dynamic friction coefficients than the external surface of the one or more communication conduit(s) of the functional member, so as to form a bundle of communication conduits, then an additional step of introducing the functional member into the flexible bag by sliding the bundle of communication conduits relative to the peripheral wall of the flexible bag. Finally, the bag is hermetically sealed prior to sterilization of its contents, for example by irradiation.

In this case, according to one embodiment, the structural association means are formed by one or more flexible spiral sheath(s) having a succession of turns distributed along the bundle of communication conduits such that two successive turns are spaced apart in the longitudinal direction by a predetermined maximum distance so as to substantially negate the effects of dynamic friction between the bundle of communication conduits and the peripheral wall of the flexible bag.

More particularly, the formation of the bundle of communication conduits comprises a plurality of steps consisting of: first winding one of the end portions of the or of the at least one flexible spiral sheath(s) around only one of the portions to be bundled of one of the communication conduits, then winding a middle portion of the or of the at least one flexible spiral sheath(s) around the entire set of communication conduits so as to form the bundle of communication conduits, and lastly, winding the other end portion of the one or of the at least one flexible spiral sheath(s) around only one of the portions to be bundled of one of the communication conduits forming the bundle of communication conduits.

In one aspect, the invention also relates to a method for unpackaging an individual set used in the process of manufacturing a biopharmaceutical product, comprising a plurality of steps consisting of: providing a sterile flexible bag equipped with a peripheral wall defining a sterile internal space within which a fluidic-type functional member is at least partially arranged, said fluidic-type functional member comprising one or more communication conduit(s) suitable for the sterile fluid transfer of fluid components and having an external surface with higher static and dynamic friction coefficients. In the unpackaging method, the functional member also comprises structural association means which, on the one hand, are arranged around and distributed along one or more portion(s) to be bundled of the communication conduit(s) so as to form a bundle of communication conduits to facilitate their manipulation, and on the other hand, have an external surface with lower static and dynamic friction coefficients than the external surface of the one or more communication conduit(s) of the functional member; and the method comprises an additional step of removing the functional member from the flexible bag by sliding the bundle of communication conduits relative to the peripheral wall of said flexible bag.

BRIEF DESCRIPTION OF THE DRAWINGS

Other features and advantages of the invention will become apparent from the description which is given below for information only and is not intended to be limiting, with reference to the accompanying drawings in which:

FIG. 4b is a detailed perspective view of a bundle of three communication conduits retained by means of the first example of structural association means shown in FIG. 4a;

FIG. 5b is a detailed perspective view of a bundle of three communication conduits retained by means of the second example of structural association means shown in FIG. 5a.

DETAILED DESCRIPTION OF THE INVENTION

Figure 1:
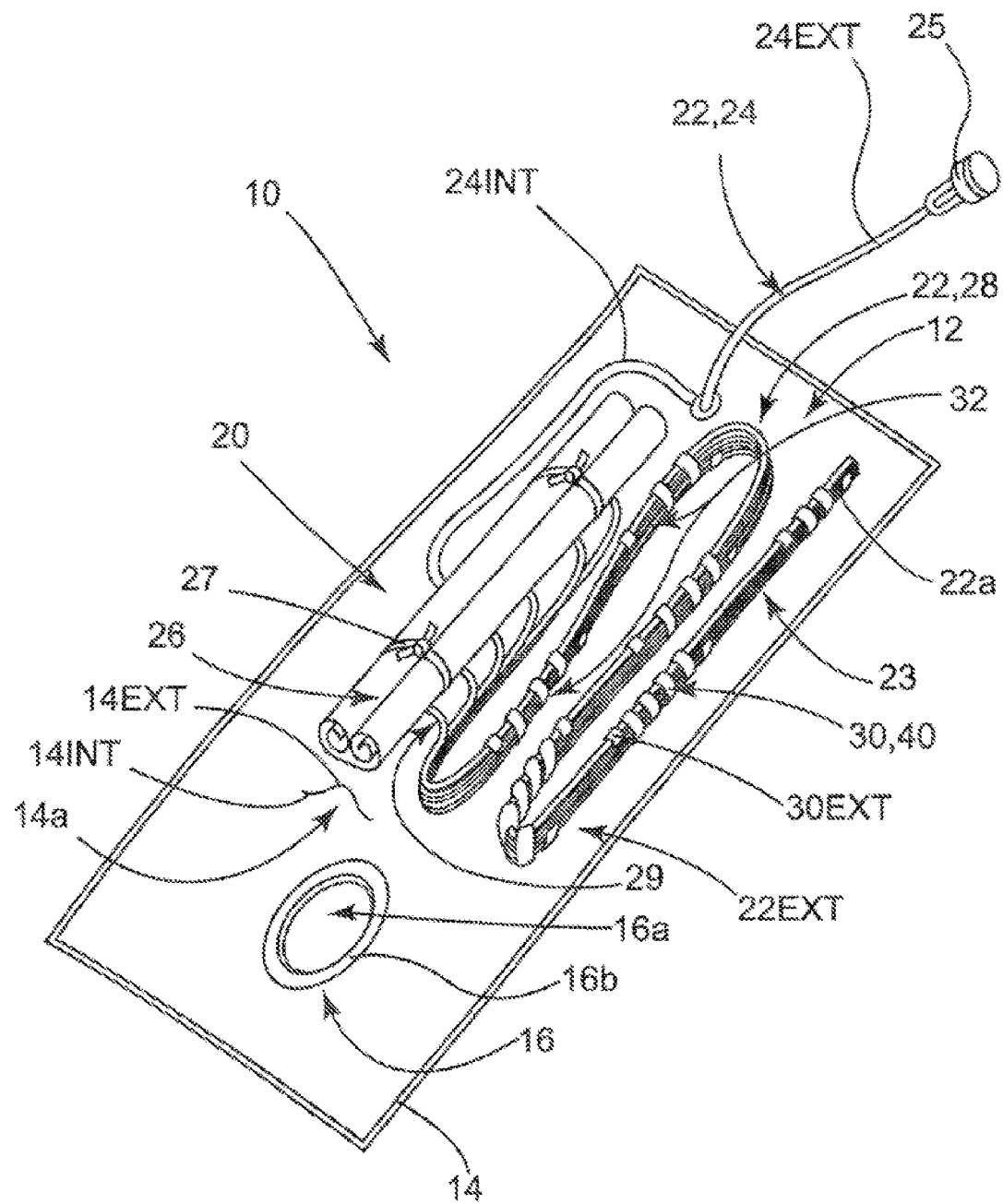
FIG. 1 is a general perspective view of a first embodiment of a sterile individual set according to the invention, comprising a sterile flexible bag in which is arranged a functional member provided with a plurality of fluid communication conduits of which some are grouped into a bundle of communication conduits by structural association means consisting of flexible spiral sheaths.

The invention applies to the technical field of biopharmaceutical production.

More particularly, the invention aims to provide sterile individual sets 10 usable within the context of the manufacture of biopharmaceutical products.

In the remainder of the description, the adhesion properties of the elements forming the sterile individual set 10 are significant and contribute to the definition of the invention. For clarity, it should therefore be noted that the term "adhesion" refers to friction forces between two surfaces in contact with each other and which oppose their relative tangential movements. More particularly, the adhesion of a surface is characterized by the static and dynamic friction coefficients of its constituent material. The higher the static friction coefficient of a material, the greater the level of adhesion of a surface formed from this material when the surface is at rest. Similarly, the higher the dynamic friction coefficient of a material, the greater the level of adhesion of a surface formed from this material when the surface is in motion.

In the following description, the elements with the highest static and dynamic friction coefficients—considered to be elements with higher adhesion—will be indicated as such in comparison to items having lower static and dynamic friction coefficients—considered to be elements with lower adhesion. These two concepts are therefore to be interpreted in a relative manner.

Several embodiments of sterile individual sets 10 according to the invention are described with reference to FIGS. 1, 2 and 3.

Such sterile individual sets 10 firstly comprise a flexible bag 12.

The flexible bag 12 has a peripheral wall 14 which defines a sterile internal space 14a having a capacity which can vary within a wide range.

The flexible bag 12 is intended to contain, within the sterile internal space 14a, elements that have not been exposed to ambient air—or more generally to a substandard environment—and are therefore not contaminated, so that they can safely be used in the manufacture of biopharmaceutical products. The structure of the flexible bag 12 ensures and maintains sufficient fluidtightness to prevent contamination of the sterile internal space 14a.

To achieve this, the peripheral wall 14 of the flexible bag 12 may, for example, be formed of a single-layer film made from a polymer material ensuring fluidtightness of the sterile internal space 14a. The peripheral wall 14 may be made of polyamide (PA), polyethylene (PE), polypropylene (PP), or a similar material. According to another embodiment, the peripheral wall 14 of the flexible bag 12 may be formed of a multi-layer film consisting of several layers of different materials also ensuring fluidtightness of the sterile internal space 14a.

As a non-limiting example, the peripheral wall 14 may have an internal surface $14_{INT}$ made of polyamide (PA), polyethylene (PE), polypropylene (PP), or any similar material, and possibly one or more other external functional layers which may be made from other materials, depending on the technical specifications desired.

Figure 2:
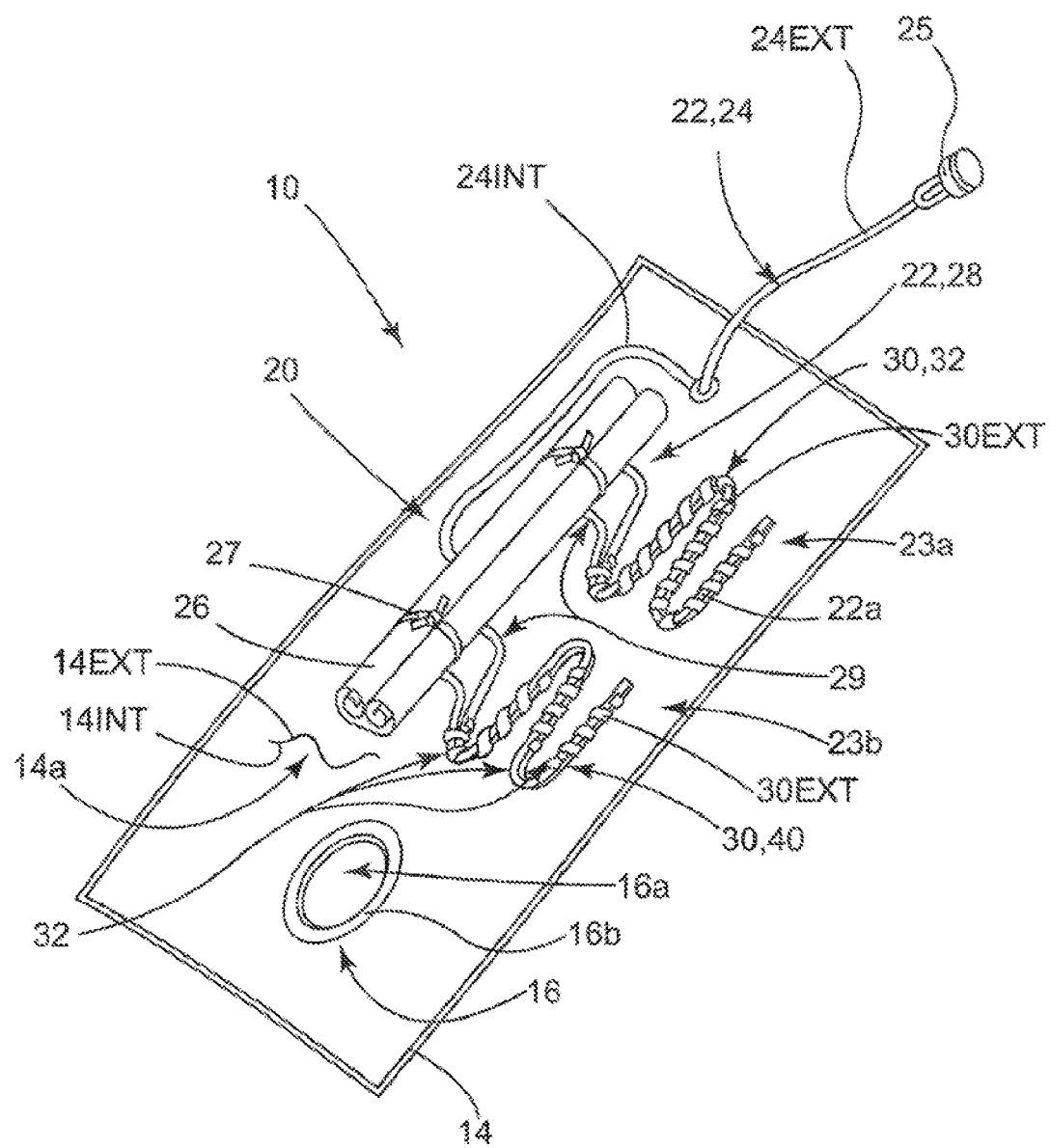
FIG. 2 is a general perspective view of a second embodiment of a sterile individual set according to the invention, comprising a sterile flexible bag in which is arranged a functional member provided with a plurality of fluid communication conduits, two of them grouped into a first bundle of communication conduits by structural association means formed by a plurality of flexible spiral sheaths, and two others grouped into a separate and independent second bundle of communication conduits by other structural association means.
Figure 3:
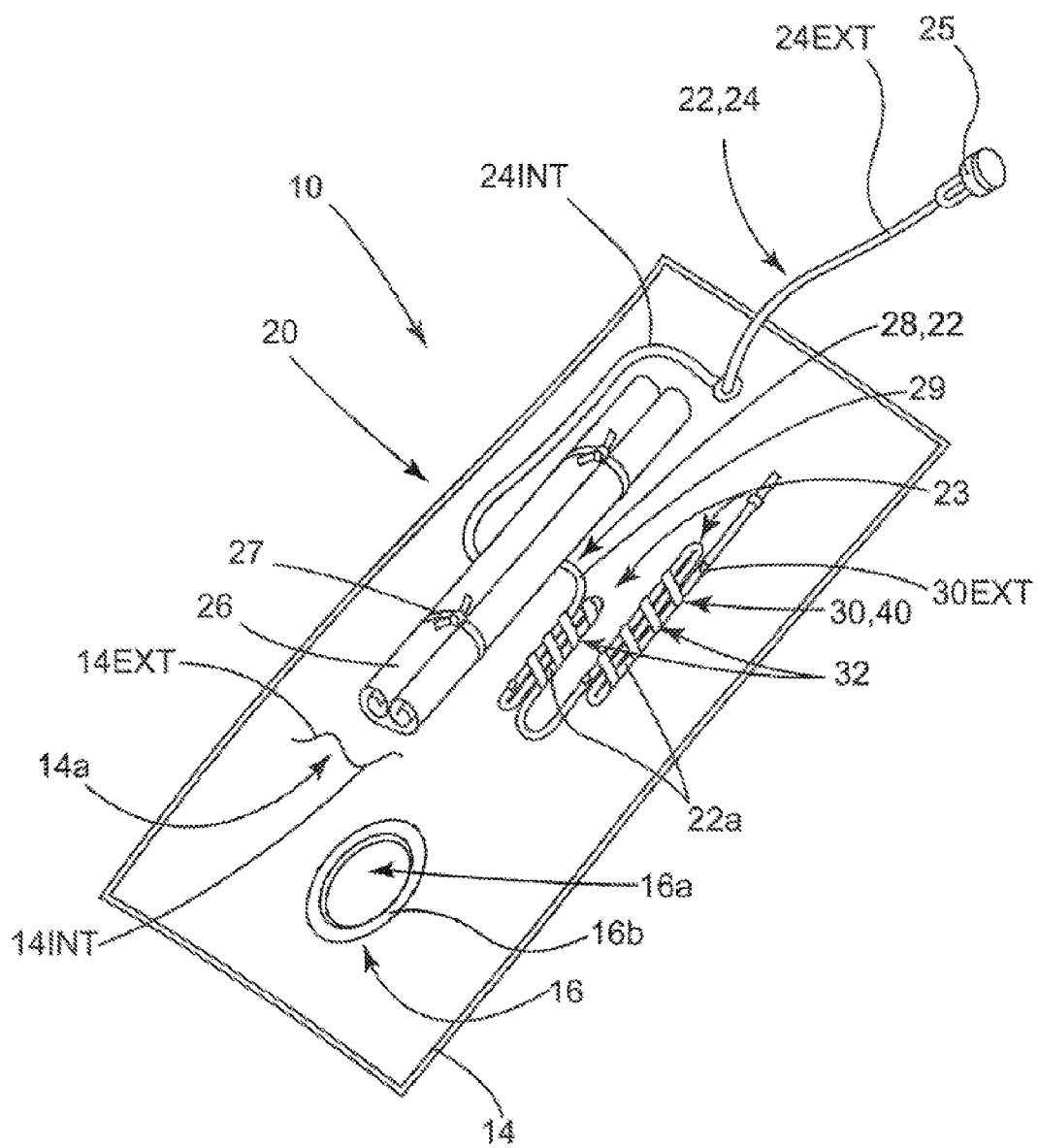
FIG. 3 is a general perspective view of a third embodiment of a sterile individual set according to the invention, comprising a sterile flexible bag in which is arranged a functional member provided with a fluid communication conduit having several portions to be bundled grouped into a bundle of communication conduits by structural association means consisting of a plurality of flexible spiral sheaths.

According to the embodiments of FIGS. 1, 2 and 3, the peripheral wall 14 is provided with a port 16 associated with an opening 16a formed in the peripheral wall 14.

The port 16 may, if necessary, be complementary to a port arranged in a sterile enclosure (not shown) where—for example—the biopharmaceutical products will be manufactured.

The port 16 includes a removable flange 16b able to be associated with the sterile enclosure by association means and maneuvering means provided for this purpose. Such association means and maneuvering means may comprise systems with catches and complementary grooves, cams and levers, or similar systems, for example. Thus, the flexible bag 12 and the sterile individual set 10 can be rigidly and releasably associated with the enclosure, the port 16 of the flexible bag 12 engaging with the port of the sterile enclosure.

The port 16 also includes a flap (not shown) that is movable between a closed position where it cooperates in a complementary manner with the flange 16b to close the opening 16a, and an open state in which it is disengaged from the flange 16b and clears the opening 16a. Means are provided for maneuvering the port of the sterile enclosure, which may include hinges, levers, motors, or similar means, for example. Means are also provided for rigidly and removably associating the flap of the flexible bag 12 with the enclosure port, so as to allow communication between the sterile internal space 14a of the sterile flexible bag 12 with the interior of the enclosure. In this way, it is possible to effect a transfer from one to the other, either in order to introduce something that had been in the sterile internal space 14a of the flexible bag 12 and transfer it to inside the sterile enclosure, or to remove something located inside the chamber and transfer it to inside the sterile internal space 14a of the flexible bag 12. This association of the flexible bag 12 and enclosure is done in a sterile manner, so that the transfer concerned (introduction or removal) is also sterile.

It should be noted that the example shown in FIGS. 1, 2 and 3 has a port 16 and an opening 16a according to a particular embodiment described in EP-A1-0 688 020, hereby incorporated by reference. However, other alternative embodiments also allow achieving a flexible bag 12 having a peripheral wall 14 defining a sterile internal space 14a.

By way of example and not limitation, it is possible to consider creating the peripheral wall 14 as a single piece completely closed on itself to define the sterile internal space 14a.

The sterile individual set 10 of the invention also comprises one or more functional members 20.

At least one of these functional members 20 is of the sterile fluidic type, meaning that it is designed to provide fluid communication, with no loss of seal, within the context of the process of manufacturing biopharmaceutical products.

According to the embodiments of FIGS. 1, 2 and 3, the sterile individual set 10 includes a functional member 20 consisting of several communication conduits 22 intended for the transfer of sterile fluid. In one embodiment, the communication conduits 22 are—due to their nature and function—fairly flexible but still have a certain rigidity to facilitate their manipulation and placement within the flexible bag 12 as well as during the manufacture of biopharmaceutical products.

More particularly, the functional member 20 has a communication conduit 22 forming an upstream communication section 24, also called the pass-through section. This upstream communication section 24 passes through the peripheral wall 14 in a sterile manner and has an external portion $24_{EXT}$ located outside the sterile internal space 14a and an internal portion $24_{INT}$ located inside the sterile internal space 14a. The end of the external portion $24_{EXT}$ comprises an aseptic connector 25 which allows, on the one hand, closing off the external portion $24_{EXT}$ to prevent any external contamination, and on the other hand, establishing a sterile connection with another element located outside the flexible bag 12. By way of example and not limitation, this aseptic connector 25 may correspond to the Opta® product offered by Sartorius Stedim Biotech. The upstream communication section 24 is therefore intended for ensuring sterile fluid transfer between the outside and the inside of the flexible bag 12.

The functional member 20 also has a flexible container 26 located within the sterile internal space 14a. In particular, the flexible container 26 is in fluid communication with the internal portion $24_{INT}$ of the upstream communication section 24, to allow the passage of fluid components from one to the other. Said internal portion $24_{INT}$ of the upstream communication section 24 may be connected to the flexible container 26 by welding, gluing, by means of a connector, or by any other appropriate means of sterile association. The flexible container 26 here is held folded onto itself by ties 27 to minimize the space it occupies within the sterile internal space 14a of the flexible bag 12.

The functional member 20 also has a plurality of communication conduits 22 forming downstream communication sections 28. The downstream communication sections 28 are also positioned within the sterile internal space 14a of the flexible bag 12. Furthermore, they are in fluid communication with the flexible container 26 to ensure the transfer of fluid components from the flexible container 26 to the downstream communication sections 28 and vice versa. Here again, the downstream communication sections 28 may be connected to the flexible container 26 by any appropriate means of sterile association, such as welding, gluing, the use of connectors, or any similar means.

According to the embodiments of FIGS. 1, 2 and 3, the sterile individual set 10 therefore comprises a functional member 20 composed of several communication conduits 22 and a flexible inner container 26. However, in alternative embodiments, it would also be possible for a sterile individual set 10 of the invention to comprise several different and distinct functional members 20. Depending on the case, these may for example be communication means selected from among the group comprising tubes, pipes, conduits, and the like. These may be distribution means, typically selected from among the group comprising pumps and the like. These may be filling members, selected from among the group comprising injection needles, nozzles, and the like. Furthermore, these may be filtering means, buffer storage means, connection means, etc. Of course, this list is not exhaustive and the term "functional member" may refer to other elements likely to be used in biopharmaceutical production.

The functional member 20 thus has a plurality of communication conduits 22.

The "longitudinal directions" of the communication conduits 22 should be understood to mean the directions—curved or straight—along which the communication conduits 22 lie.

In one embodiment, the communication conduits 22 are formed from a layer of materials ensuring the permeability of fluid transfers. They may thus be made from silicone, ethylene-vinyl acetate (EVA), thermoplastic elastomer (TPE), or other similar materials.

However, it is also possible for the communication conduits 22 to be formed from multiple layers which allow providing functions other than fluidtightness. As before, the internal layer(s) $22_{INT}$ can be formed of different types of materials according to the desired technical specifications, while the external layer $22_{EXT}$ can be made of silicone, ethylene-vinyl acetate (EVA), a thermoplastic elastomer (TPE), or other similar materials.

The communication conduits 22 thus have an external surface $22_{EXT}$ with static and dynamic friction coefficients likely to generate strong adhesion when the communication conduits 22 are in contact with the peripheral wall 14 of the flexible bag 12. For example, when the communication conduits 22 have an external surface 22a of silicone, they adhere easily and significantly to the internal surface of the peripheral wall 14 of the flexible bag 12.

The sterile individual set 10 of the invention also comprises structural association means 30.

These structural association means 30 are arranged within the sterile internal space 14a and are designed to hold together a plurality of portions to be bundled 22a of the communication conduit(s) 22 of the functional member 20.

Specifically, to simplify manipulation of the functional member 20 when the latter is within the sterile internal space 14a, the structural association means 30 are arranged to bring together the portions to be bundled 22a, so as to form a bundle 23 of communication conduits 22.

The bundle 23 of communication conduits 22 then forms a specific structural unit having a certain rigidity, a certain behavior, and/or a certain organization within the sterile internal space 14a of the flexible bag 12, which facilitates its manipulation.

The "longitudinal direction" of the bundle 23 of communication conduits 22 should be understood to mean the direction—curved or straight—along which said bundle lies.

To ensure the structural association of said bundle 23 of communication conduits 22 while avoiding the adhesion issues mentioned above, the structural association means 30 are arranged around the bundle 23 of communication conduits 22 and are placed all along said bundle 23 of communication conduits 22. Also, to reduce adhesion of the bundle 23 of communication conduits 22 to the peripheral wall 14, the structural association means have an external surface $30_{EXT}$ with lower static and dynamic friction coefficients than those of the external surface $22_{EXT}$ of the communication conduits 22 of the functional member.

In this manner, contacts between the external surface $22_{EXT}$ of the communication conduits 22 and the internal surface $14_{INT}$ of the peripheral wall 24 are at least partly replaced by contacts between the external surface $30_{EXT}$ of the structural association means 30 and the peripheral wall 14. As the static and dynamic friction coefficients of the external surface $30_{EXT}$ of the structural association means 30 are lower than those of the external surface $22_{EXT}$ of the communication conduits 22, adhesion of the bundle 23 of communication conduits 22 to the peripheral wall 14 is reduced, which facilitates its manipulation.

The structural association means 30 thus combine two functions: ensuring the structural integrity of the bundle 23 of communication conduits 22, and facilitating its sliding relative to the peripheral wall 14. In this manner, the operations of manipulating the functional member 20 when it is at least partially inside the flexible bag 12 are facilitated and the risk of damaging the flexible bag 12 is reduced.

In general, it is useful for the structural association means 30 to have at least one elastically deformable component section 32. The structural association means 30 are then able to be reshaped in order to easily and quickly clamp multiple types of bundles 23 of communication conduits 22, despite variations in the number or dimensions of the portions to be bundled 22a.

The basic segment 32 may be closed on itself, which reduces the risk of a bundle 23 of communication conduits 22 coming unbundled, or may be open, which simplifies placing the communication conduits 22 inside the structural association means 30.

The first embodiment of the sterile individual set 10 shown in FIG. 1 is now described in detail.

In this embodiment, the functional member 20 has six communication conduits 22, in this case the downstream communication sections 28, grouped into a single bundle 23 of communication conduits 22. This bundle 23 of communication conduits 22 extends along only a portion of the communication conduits 22, as said conduits have free ends 29 spaced apart from each other and connected to the flexible container 26.

The structural association means 30 are formed by a plurality of component sections 32 arranged discontinuously along the bundle 23 of communication conduits 22. Thus, the successive component sections 32 are arranged around different portions to be bundled 22a and are spaced apart from each other by a predetermined maximum distance, for example of up to about 20 centimeters, which ensures efficient sliding of the bundle 23 of communication conduits 22 relative to the peripheral wall. This arrangement reduces the length of the structural association means 30 to be used while eliminating most of the effects of dynamic friction between the bundle 23 of communication conduits 22 and the peripheral wall 14.

Of course, the distance separating the component sections 32 forming the structural association means 30 could be different and could vary from one component section 32 to the next. It only needs to be sufficient to eliminate the effects of dynamic friction between the bundle 23 of communication conduits 22 and the peripheral wall 14.

With this embodiment, it is not necessary to position the structural association means 30 continuously along the bundle 23 of communication conduits 22, which reduces the use of structural association means 30 as well as the corresponding production costs, and speeds up the step of forming the bundle 23 of communication conduits 22.

However, the structural association means 30 could also be formed as a single piece arranged continuously all along the bundle 23 of communication conduits 22 that is part of the sterile individual set 10 of FIG. 1.

It should also be noted that the bundle 23 of communication conduits 22 is organized within the sterile internal space 14a so as to prevent any overlaps between the different portions to be bundled 22a. This facilitates grasping and manipulating the bundle of communication conduits.

The second embodiment of the sterile individual set 10 shown in FIG. 2 is now described in detail.

In this second embodiment, the functional member 20 has four communication conduits 22 which form the downstream communication sections 28 and are grouped into two separate and independent bundles 23 of communication conduits 22, each comprising two communication conduits 22. These two bundles 23 of communication conduits 22 extend along only a portion of the downstream communication sections 28, since said sections have free ends 29 spaced apart from each other and connected to the flexible container 26.

The first bundle 23b of communication conduits 22 has structural association means 30 formed by a plurality of component sections 32. These sections are arranged discontinuously along the first bundle 23a of communication conduits 22. More particularly, the successive component sections 32 are arranged around different portions to be bundled 22a and are again spaced apart from one another by a predetermined maximum distance. The length of the structural association means 30 used is thus reduced but most of the effects of dynamic friction between the first bundle 23a of communication conduits 22 and the peripheral wall 14 are still eliminated.

The second bundle 23a of communication conduits 22 has structural association means 30 formed by a single component section 32 arranged around the portions to be bundled 22a of each of the communication conduits 22. This single component section 32 extends along the entire length of the second bundle 23b of communication conduits 22 so that the risk of adhesion to the peripheral wall 14 is completely controlled.

Moreover, and as above, the first and second bundles 23a, 23b of communication conduits 22 are arranged within the sterile internal space 14a so that they do not overlap and to facilitate grasping and manipulating them.

The third embodiment of the sterile individual set 10 shown in FIG. 3 is now described in detail.

In this third embodiment, the functional member 20 has a single communication conduit 22, forming the downstream communication section 28. This communication conduit 22 has a plurality of portions to be bundled 22a, which are grouped into two separate bundles 23 of communication conduit 22.

More particularly, the communication conduit 22 first presents three portions to be bundled 22a that are grouped together and retained in this position by a first component section 32 that is part of the structural association means 30. Next, said communication conduit 22 presents three separate other portions to be bundled 22a, held together by means of a second component section 32 that is distinct from the first component section 32.

It should be noted that the two bundles 23 of communication conduits 22 are spaced apart from each other by a predetermined maximum distance which eliminates most of the effects of dynamic friction between the bundles 23 of communication conduits 22 and the peripheral wall 14.

As above, the bundles 23 of communication conduits 22 are arranged within the sterile internal space 14a so that they do not overlap and to facilitate grasping and manipulating them.

The sterile individual set 10 of the invention may comprise several embodiments of the structural association means 30.

Figure 4A:
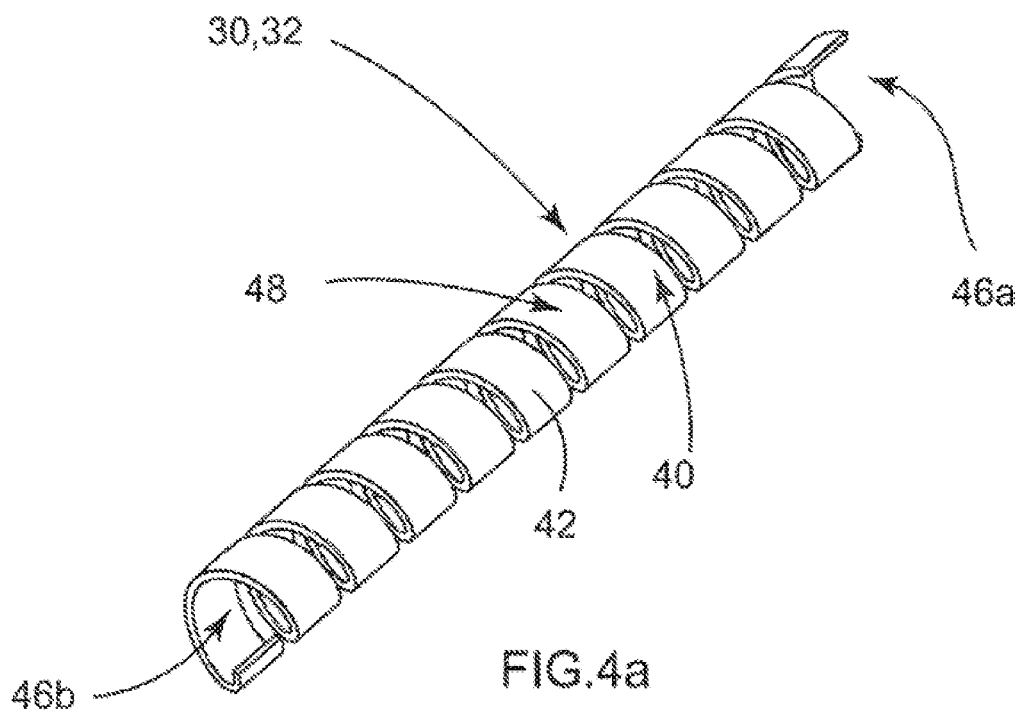
FIG. 4a is a detailed perspective view of a first exemplary embodiment of structural association means capable of being part of an individual set of the invention, in this case formed by a flexible spiral sheath.
Figure 4B:
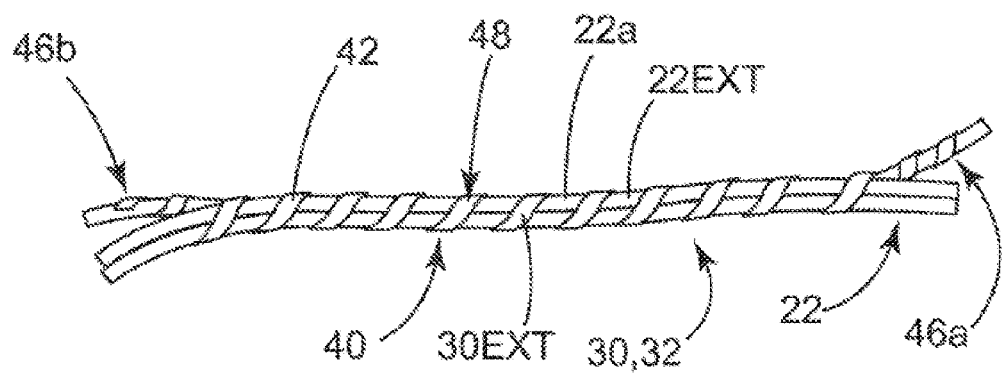

According to a first embodiment shown in FIGS. 4a and 4b, the structural association means 30 are formed by a flexible spiral sheath 40 having a succession of turns 42 which are elastically deformable so as to surround and hold together multiple portions to be bundled 22a of one or more communication conduits 22.

According to this embodiment, the flexible spiral sheath 40 may be of variable length and extend in the longitudinal direction of the communication conduit(s) when the sheath is in the usage position. The flexible spiral sheath 40 is then able to clamp at least part of the portions to be bundled 22a of each of the communication conduits 22.

Such a flexible spiral sheath 40 is both modular and secure. On the one hand, the turns 42 of the flexible spiral sheath 40 are elastically deformable to allow clamping different sizes of bundles 23 of communication conduits 22, and on the other hand, given its closed geometry, the flexible spiral sheath will not allow any of the communication conduits 22 to escape.

In addition, the flexible spiral sheath 40 is made from a material having static and dynamic friction coefficients that are lower than those of the communication conduits 20. By way of example and not limitation, according to one embodiment said flexible spiral sheath 40 has an external layer made of polypropylene (PP) or any other similar material.

In this manner, when the flexible spiral sheath 40 is in place around the portions to be bundled 22a of the bundle 23 of communication conduits 22, it is this sheath which is primarily in contact with the peripheral wall 14 and which therefore allows more satisfactory sliding of the bundle 23 of communication conduits 22.

As indicated above, the structural association means 30 may be formed by a single component section 32 forming a single flexible spiral sheath 40 arranged continuously along the bundle 23 of communication conduits 22. This is shown in FIG. 4b. The risk of the bundle 23 of communication conduits 22 adhering to the peripheral wall 14 of the flexible bag 12 is thus controlled for the entire length of said bundle 23 of communication conduits 22.

In contrast, and as indicated above, the structural association means 30 may be formed by a plurality of component sections 32 forming a plurality of separate and independent flexible spiral sheaths 40, of identical or different lengths and structures and arranged discontinuously along the bundle 23 of communication conduits 22. In this case, two successive flexible spiral sheaths 40 are, according to an advantageous embodiment, spaced apart in the longitudinal direction by a predetermined maximum distance which substantially negates the effects of dynamic friction between the bundle 23 of communication conduits 22 and the peripheral wall 14 of the flexible bag 12.

By way of example and not limitation, the structural association means 30 may for example be formed of a plurality of flexible spiral sheaths each having a minimum length of 10 centimeters and separation distances which can range from 0 to about 20 centimeters. This allows reducing the number of flexible spiral sheaths 40 to be assembled around the bundles 23 of communication conduits 22, while maintaining a level of adhesion allowing the bundle 23 of communication conduits 22 to slide against the peripheral wall 14 of the flexible bag 12.

It is also of interest to use flexible spiral sheaths 40 having turns 42 spaced from each other by a maximum distance of about 4 centimeters in the longitudinal direction when the flexible spiral sheaths 40 are in place around the bundle 23 of communication conduits 22. Such an arrangement also reduces the chances of the peripheral wall 14 coming in contact with the communication conduits 22, between two successive turns 42 of the flexible spiral sheaths 40.

Each component section 32 formed by a flexible spiral sheath 40 has two end portions 46a, 46b, and a middle portion 48 arranged between the two end portions 46a, 46b.

According to one particular embodiment, the flexible spiral sheath 40 has a middle portion 48 wrapped around the set of portions to be bundled 22a of the bundle 23 of communication conduits 22, and has one or both of the end portions 46a, 46b wrapped around only one portion to be bundled 22a of one of the communication conduits 22 forming the bundle 23 of communication conduits 22.

Such an embodiment has the advantage of protecting the external surface $22_{EXT}$ of the communication conduits 22 when the flexible spiral sheath 40 has sharp edges on its end portions 46a, 46b.

Figure 5A:
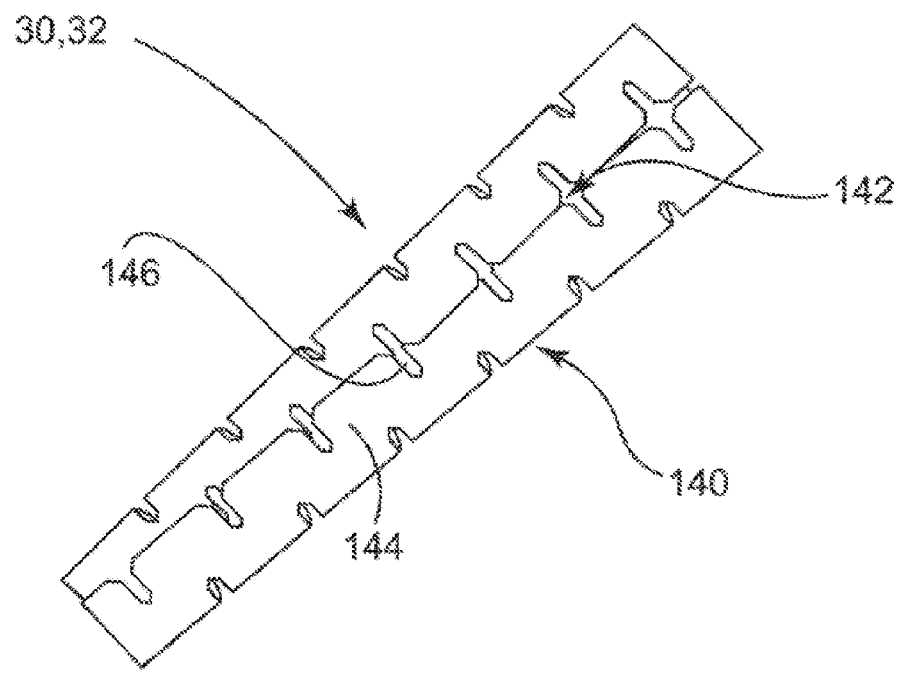
FIG. 5a is a detailed perspective view of a second exemplary embodiment of structural association means capable of being part of an individual set of the invention, in this case formed by an open flexible sheath having a longitudinal opening.
Figure 5B:
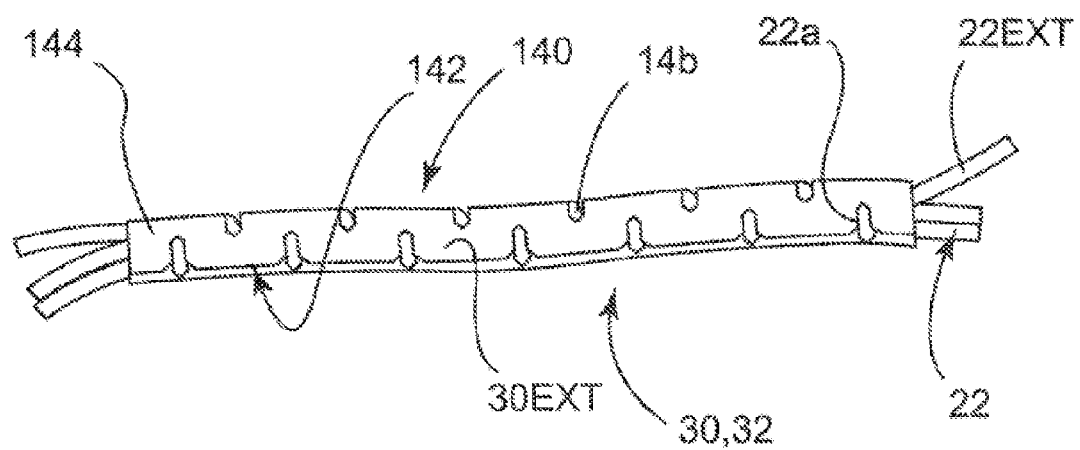

In a second embodiment shown in FIGS. 5a and 5b, the structural association means 30 are formed by an open flexible sheath 140.

Such an open flexible sheath 140 is offered by the METAFIX company under the name "GAINE FLASH" (Flash Sheath) and has an open cross-section at a longitudinal opening 142 which allows it to be elastically deformable in the transverse direction—meaning in a direction perpendicular to the longitudinal direction.

More particularly, this open flexible sheath 140 can flex transversely to allow the insertion or removal of portions to be bundled 22a of communication conduits 22 and thus the grouping or ungrouping of a bundle 23 of communication conduits 22. The open flexible sheath 140 is thus able to clamp and hold together the portions to be bundled 22a of one or more communication conduits 22.

In addition, the open flexible sheath 140 has a body 144 provided with a plurality of notches 142 evenly distributed in the longitudinal direction to allow the open flexible sheath 140 to bend.

According to some embodiments, the open flexible sheath 140 may be of variable length and extend in the longitudinal direction of the communication conduit(s) when in its usage position.

Such an open flexible sheath 140 is both modular and fast to install. Indeed, on the one hand this open flexible sheath 140 has a body that is elastically deformable to allow clamping different sizes of bundles 23 of communication conduits 22, and on the other hand, because of the presence of the longitudinal opening, it is possible to quickly clamp the different portions to be bundled 22a that constitute the bundle of communication conduits 22.

In addition, the open flexible sheath 140 is made from a material having static and dynamic friction coefficients that are lower than those of the communication conduits 20. By way of example and not limitation, said open flexible sheath 140 has, according to one embodiment, an external layer made of polypropylene (PP) or any other similar material. In this manner, when the open flexible sheath 140 is in place around the portions to be bundled 22a of the bundle 23 of communication conduits 22, it is this sheath which is primarily in contact with the peripheral wall 14 and which therefore allows more satisfactory sliding of the bundle 23 of communication conduits 22.

As indicated above, the structural association means 30 may then be formed by a single component section 32 forming a single open flexible sheath 140 arranged continuously along the bundle 23 of communication conduits 22. This is shown in FIG. 5b. The risk of the bundle 23 of communication conduits 22 adhering to the peripheral wall 14 of the flexible bag 12 is thus controlled for the entire length of said bundle 23 of communication conduits 22.

In contrast, and as indicated above, the structural association means 30 may be composed of a plurality of component sections 32 formed from open flexible sheaths 140 which are separate and independent, of identical or different lengths and structures and arranged in a discontinuous and possibly irregular manner along the bundle 23 of communication conduits 22. in this case, two successive open flexible sheaths 140 are, according to an advantageous embodiment, spaced apart in the longitudinal direction by a predetermined maximum distance which substantially negates the effects of dynamic friction between the bundle 23 of communication conduits 22 and the peripheral wall 14 of the flexible bag 12.

According to yet another embodiment (not shown), the structural association means 30 may be formed by a plurality of flexible rings (not shown).

The flexible rings have, in one non-limiting embodiment, an open cross-section at a longitudinal opening in order to allow elastic deformation in the transverse direction.

More particularly, these flexible rings can flex transversely to allow the insertion or removal of portions to be bundled 22a of communication conduits 22 and thus the grouping or ungrouping of a bundle 23 of communication conduits 22. The flexible rings are thus able to clamp and hold together a plurality of portions to be bundled 22a of one or more communication conduits 22.

In addition, the flexible rings have a body of constant or variable length, which may for example be between 0.5 and 20 centimeters.

In addition, the flexible rings are made from one or more materials having static and dynamic friction coefficients that are lower than those of the communication conduits 20. By way of example and not limitation, the flexible rings have, according to one embodiment, an external layer made of polypropylene (PP) or any other similar material. In this manner, when the flexible rings 240 are in place around the portions to be bundled 22a of the bundle 23 of communication conduits 22, it is these flexible rings which are primarily in contact with the peripheral wall 14 and which therefore allow more satisfactory sliding of the bundle 23 of communication conduits 22.

According to this embodiment, the structural association means 30 are formed by a plurality of component sections 32 each formed by a flexible ring and which are regularly or irregularly distributed along the bundle 23 of communication conduits 22. In this case, two successive flexible rings 240 are, according to an advantageous embodiment, spaced apart in the longitudinal direction by a predetermined maximum distance that is preferably less than a few centimeters. It is thus possible to substantially negate the effects of dynamic friction between the bundle 23 of communication conduits 22 and the peripheral wall 14 of the flexible bag 12.

The method for packaging a sterile individual set 10 according to the invention is now described in detail.

It is first necessary to provide a flexible bag 10 having a peripheral wall 14 defining a sterile internal space 14a, or more particularly adapted to be sterilized once the flexible bag 10 has been sealed.

It is also necessary to provide one or more fluidic-type functional members such as those mentioned above, and for at least one of these functional members 30 to have one or more communication conduits 22 provided with an external surface $22_{EXT}$ having higher static and dynamic friction coefficients.

The packaging method according to the invention then comprises a step of arranging the previously described structural association means 30 around the communication conduits 22, and distributing said structural association means 30 along the portions to be bundled 22a of the communication conduits 22.

These may be flexible spiral sheaths 40, open flexible sheaths 140, a plurality of elastic rings, or any other suitable structural association means 30, arranged along the bundle 23 of communication conduits 22 and having an external surface with lower static and dynamic friction coefficients than the external surface $22_{EXT}$ of the communication conduits 22.

Then, as said structural association means 30 have an external surface $30_{EXT}$ with lower static and dynamic friction coefficients than the external surface $22_{EXT}$ of the communication conduits 22, the bundle 23 of communication conduits 22 thus formed, and more generally the functional member 20, can be inserted into the flexible bag 12 by sliding the bundle 23 of communication conduits 22 relative to the peripheral wall 14 of the flexible bag 12. The bag is then sealed closed (by welding the film, for example) and its contents can be sterilized, in particular by irradiation, with no risk of external contamination, because of the presence of the aseptic connector 25.

The method for unpackaging a sterile individual set 10 according to the invention is now described in detail.

According to one embodiment, this unpackaging method consists of providing a sterile individual set 10 intended for use in the process of manufacturing a biopharmaceutical product, as described above.

The flexible individual set 10 has one or more functional members 30 arranged within the sterile internal space 14a of the flexible bag 12 and comprising structural association means 30.

These structural association means 30 are arranged around communication conduits 22 and are distributed along a plurality of portions to be bundled of these communication conduits 22, forming the bundle 23 of communication conduits 22. These structural association means 30 have an external surface with lower static and dynamic friction coefficients than the external surface $22_{EXT}$ of the communication conduits 22.

For easy unpackaging of the sterile individual set 10 of the invention, the functional member 30 is removed from the flexible bag 12 by sliding out the bundle 23 of communication conduits 22 relative to the peripheral wall 14 of said flexible bag 12. Then the structural association means 30 are removed so as to unbundle the bundles 23 of communication conduits 22 and allow making use of the functional member(s) 20.

The invention claimed is:

1. A sterile individual set intended for use in the process of manufacturing a biopharmaceutical product, the set comprising:
   a sterile flexible bag provided with a peripheral wall defining a sterile internal space and a fluidic-type functional member arranged at least partially within said sterile internal space,
   the functional member comprising one or more communication conduit(s) arranged within the sterile internal space, adapted to ensure the sterile fluid transfer of fluid components and having an external surface; and
   structural association elements, arranged within the sterile internal space and adapted to hold a plurality of portions to be bundled of the communication conduits(s) close to one another so as to constitute a bundle of communication conduits forming a structural unit that can be manipulated as such,
   wherein the structural association elements are arranged about and along the bundle of communication conduits and have an external surface with static and dynamic friction coefficients that are lower than those of the external surface of the one or more communication conduit(s) of the functional member, so as to facilitate manipulation of the functional member by sliding said bundle of communication conduits relative to the peripheral wall of the flexible bag.

2. The sterile individual set according to claim 1, wherein the structural association elements comprise at least one open or closed component section that is elastically deformable so as to clamp the portions to be bundled of the communication conduit(s).

3. The sterile individual set (10) according to claim 2, wherein the structural association elements have a plurality of component sections arranged discontinuously along the bundle of communication conduits, such that two successive component sections are spaced apart in the longitudinal direction of the bundle of communication conduits by a maximum predetermined distance so as to substantially negate the effects of dynamic friction between the bundle of communication conduits and the peripheral wall of the flexible bag.

4. The sterile individual set according to claim 3, wherein the structural association elements are formed by one or more flexible spiral sheath(s) having a succession of turns distributed along the bundle of communication conduits.

5. The sterile individual set according to claim 4, wherein the structural association elements are formed by a single flexible spiral sheath arranged continuously along the bundle of communication conduits.

6. The sterile individual set according to claim 4, wherein the structural association elements are formed by a plurality of flexible spiral sheaths arranged discontinuously along the bundle of communication conduits, such that two successive flexible spiral sheaths are spaced apart in the longitudinal direction by a predetermined maximum distance so as to substantially negate the effects of dynamic friction between the bundle of communication conduits and the peripheral wall of the flexible bag.

7. The sterile individual set according to claim 6, wherein the maximum distance separating two successive flexible spiral sheaths is about 20 centimeters.

8. The sterile individual set according to claim 6, wherein each of the flexible spiral sheaths has, when in place around the bundle of communication conduits, a minimum length of about 10 centimeters in the longitudinal direction.

9. The sterile individual set according to claim 6, wherein the flexible spiral sheaths have identical structural characteristics.

10. The sterile individual set according to claim 4, wherein two successive turns of the flexible spiral sheath(s) are spaced apart in the longitudinal direction by a maximum distance of about 4 centimeters.

11. The sterile individual set according to claim 4, wherein the or the at least one flexible spiral sheath(s) has (have) i) a middle portion wound around the set of portions to be bundled of the bundle of communication conduits, and ii) at least one end portion wound around only a portion to be bundled of one of the communication conduits forming the bundle of communication conduits.

12. The sterile individual set according to claim 1, comprising a plurality of separate and independent structural association elements, some being adapted to retain a plurality of portions to be bundled of the communication conduit(s) so as to form a first bundle of communication conduits that can be manipulated as such, the others being adapted to retain a plurality of other portions to be bundled of the communication conduit(s) so as to form a second bundle of communication conduits which can be manipulated as such and independently of the first bundle of communication conduits.

13. A method for packaging or unpackaging a sterile individual set according to claim 1, consisting of using structural association elements having an external surface with lower static and dynamic friction coefficients to form the bundle of communication conduits so as to facilitate the insertion or removal of the functional member into or from the flexible bag by sliding said bundle of communication conduits relative to the peripheral wall of the flexible bag.

14. A method for packaging a sterile individual set intended for use in the process of manufacturing a biopharmaceutical product, comprising:
providing a flexible bag suitable for being sterilized and equipped with a peripheral wall defining an internal space;
providing a fluidic-type functional member comprising one or more communication conduit(s) which i) are suitable for the sterile fluid transfer of fluid components and ii) have an external surface;
arranging around and distributing, along one or more portion(s) to be bundled of the communication conduit(s), structural association elements having an external surface with static and dynamic friction coefficients that are lower than those of the external surface of the one or more communication conduit(s) of the functional member, so as to form a bundle of communication conduits; and
introducing the functional member into the flexible bag by sliding the bundle of communication conduits relative to the peripheral wall of the flexible bag.

15. The method for packaging according to claim 14, wherein the structural association elements are formed by one or more flexible spiral sheath(s) having a succession of turns distributed along the bundle of communication conduits such that two successive turns are spaced apart in the longitudinal direction by a predetermined maximum distance so as to substantially negate the effects of dynamic friction between the bundle of communication conduits and the peripheral wall of the flexible bag.

16. The method for packaging according to claim 15, wherein the formation of the bundle of communication conduits comprises sub-steps of:
first winding one of the end portions of the or of the at least one flexible spiral sheath(s) around only one of the portions to be bundled of one of the communication conduits,
then winding a middle portion of the or of the at least one flexible spiral sheath(s) around the entire set of communication conduits so as to form the bundle of communication conduits,
and lastly, winding the other end portion of the one or of the at least one flexible spiral sheath(s) around only one of the portions to be bundled of one of the communication conduits forming the bundle of communication conduits.

17. A method for unpackaging a sterile individual set intended for use in the process of manufacturing a biopharmaceutical product, comprising:
providing a sterile flexible bag equipped with a peripheral wall defining a sterile internal space within which a fluidic-type functional member is at least partially arranged, said fluidic-type functional member comprising one or more communication conduit(s) suitable for the sterile fluid transfer of fluid components and having an external surface,
the functional member also comprising structural association elements which i) are arranged around and distributed along one or more portion(s) to be bundled of the communication conduit(s) so as to form a bundle of communication conduits to facilitate their manipulation, and ii) have an external surface with static and dynamic friction coefficients that are lower than those of the external surface of the one or more communication conduit(s) of the functional member; and
removing the functional member from the flexible bag by sliding the bundle of communication conduits relative to the peripheral wall of said flexible bag.

* * * * *